(12) United States Patent
Keramidas et al.

(10) Patent No.: US 9,202,308 B2
(45) Date of Patent: Dec. 1, 2015

(54) METHODS OF AND APPARATUS FOR ASSIGNING VERTEX AND FRAGMENT SHADING OPERATIONS TO A MULTI-THREADED MULTI-FORMAT BLENDING DEVICE

(71) Applicant: THINK SILICON LTD, Patras (GR)

(72) Inventors: Georgios Keramidas, Patras (GR); Iakovos Stamoulis, Patras (GR); George Sidiropoulos, Patras (GR); Michael Koziotis, Patras (GR)

(73) Assignee: THINK SILICON SA, Patras (GR)

( * ) Notice: Subject to any disclaimer, the term of this patent is extended or adjusted under 35 U.S.C. 154(b) by 0 days.

(21) Appl. No.: 14/736,553

(22) Filed: Jun. 11, 2015

(65) Prior Publication Data

US 2015/0279090 A1 Oct. 1, 2015

Related U.S. Application Data

(63) Continuation-in-part of application No. 13/338,376, filed on Dec. 28, 2011, now Pat. No. 9,058,680.

(51) Int. Cl.
*G09G 5/02* (2006.01)
*G06T 15/50* (2011.01)
*G06T 1/20* (2006.01)
*G09G 5/36* (2006.01)
*G06F 9/38* (2006.01)

(52) U.S. Cl.
CPC ............ *G06T 15/503* (2013.01); *G06F 9/3885* (2013.01); *G06T 1/20* (2013.01); *G09G 5/363* (2013.01); *G06T 2210/52* (2013.01)

(58) Field of Classification Search
None
See application file for complete search history.

(56) References Cited

U.S. PATENT DOCUMENTS 1,262,954 A 4/1918 Ives
4,384,338 A 5/1983 Bennett
(Continued)

OTHER PUBLICATIONS

Porter, Thomas et al. "Compositing Digital Images" Computer Graphics, vol. 18, No. 3, Jul. 1984, pp. 253-259.
(Continued)

*Primary Examiner* — Xiao Wu
*Assistant Examiner* — Michelle Chin
(74) *Attorney, Agent, or Firm* — Jason H. Vick; Sheridan Ross, PC

(57) ABSTRACT

An exemplary aspect relates generally to graphics processing systems and more specifically relates to executing vertex and fragment shading operations to a pixel blender device. The technology is at least applicable to graphics processing systems in which vertex and fragment shading operations are executed by dedicated fragment and vertex units or by unified shading units. The graphics processing unit driver is responsible to determine if a shading operation can be assigned to a multi-threaded, multi-format pixel blender. Based on the determination, the fragment shading operations or the vertex shading operations or both are assigned to the pixel blender for execution; the execution of the fragment and/or vertex shading operations by the shader unit(s) is skipped. The determination is based on a code analysis. Forwarding shading operations from the fragment and vertex shaders, i.e., bypassing the shading units, to a programmable, multi-threaded and multi-format pixel blender may save electrical power consumption because a programmable, multi-threaded, and multi-format pixel blender is a less complex circuit compared to a fragment or a vertex or a unified shading unit.

24 Claims, 7 Drawing Sheets

A Typical System with Graphics Processing capability

(56) References Cited

U.S. PATENT DOCUMENTS

| | | | |
|---|---|---|---|
| 4,679,040 A | | 7/1987 | Yan |
| 4,827,344 A | | 5/1989 | Astle et al. |
| 5,303,321 A | | 4/1994 | Peaslee et al. |
| 5,592,196 A | | 1/1997 | Nakamatsu et al. |
| 5,754,185 A | | 5/1998 | Hsiao et al. |
| 5,896,136 A | | 4/1999 | Augustine et al. |
| 6,092,174 A | * | 7/2000 | Roussakov ............ 712/15 |
| 7,397,479 B2 | | 7/2008 | Munshi |
| 7,973,797 B2 | | 7/2011 | Jiao et al. |
| 8,108,872 B1 | * | 1/2012 | Lindholm et al. ............ 718/104 |
| 8,325,184 B2 | | 12/2012 | Jiao et al. |
| 9,058,680 B2 | | 6/2015 | Stamoulis et al. |
| 2003/0074542 A1 | * | 4/2003 | Sasagawa ............ 712/20 |
| 2005/0237337 A1 | * | 10/2005 | Leather et al. ............ 345/582 |
| 2006/0192788 A1 | | 8/2006 | Stollnitz |
| 2008/0141004 A1 | * | 6/2008 | Kershaw et al. ............ 712/220 |
| 2009/0003730 A1 | * | 1/2009 | Pande et al. ............ 382/298 |
| 2009/0273603 A1 | * | 11/2009 | Johnson ............ 345/504 |
| 2010/0180058 A1 | * | 7/2010 | Ihori ............ 710/117 |
| 2012/0050303 A1 | * | 3/2012 | McAllister et al. ............ 345/589 |

OTHER PUBLICATIONS

Office Action for U.S. Appl. No. 13/338,376, mailed Apr. 30, 2014.
Office Action for U.S. Appl. No. 13/338,376, mailed Aug. 29, 2014.
Notice of Allowance for U.S. Appl. No. 13/338,376, mailed Feb. 20, 2015.

* cited by examiner

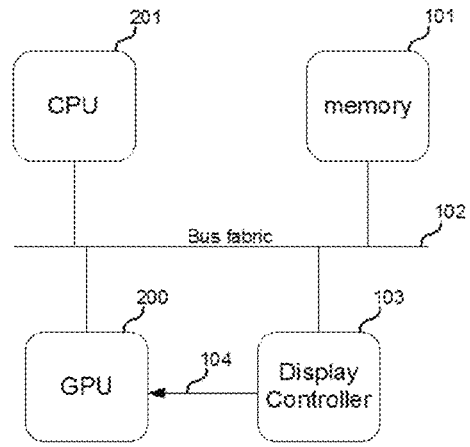
Figure 1: A Typical System with Graphics Processing capability
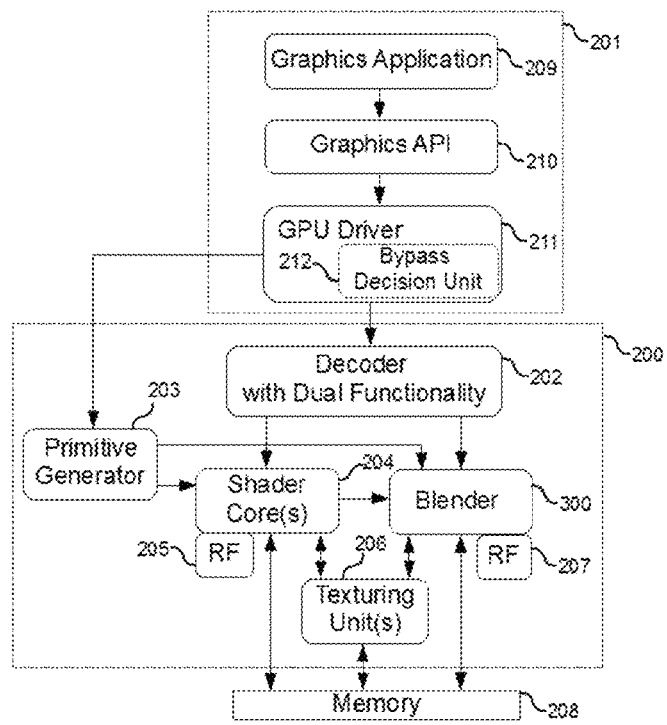
Figure 2: Example Block Diagram of a Central Processing Unit (CPU) and a Graphics Processing Unit (GPU)

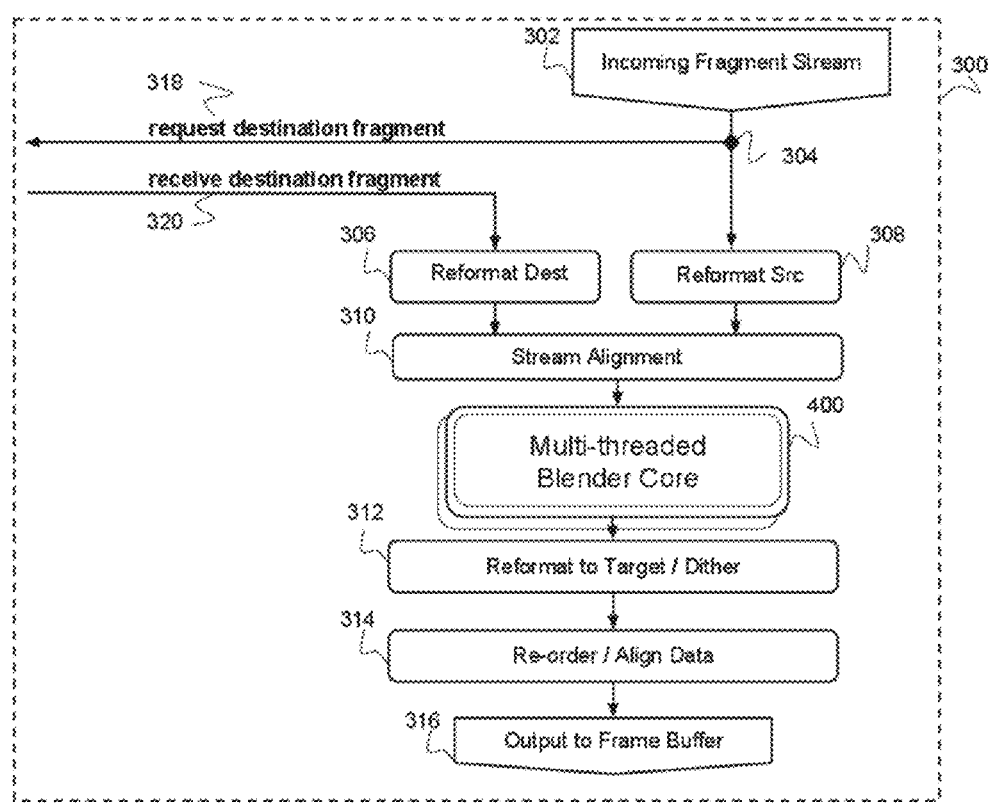
Figure 3: An embodiment of the Blending device

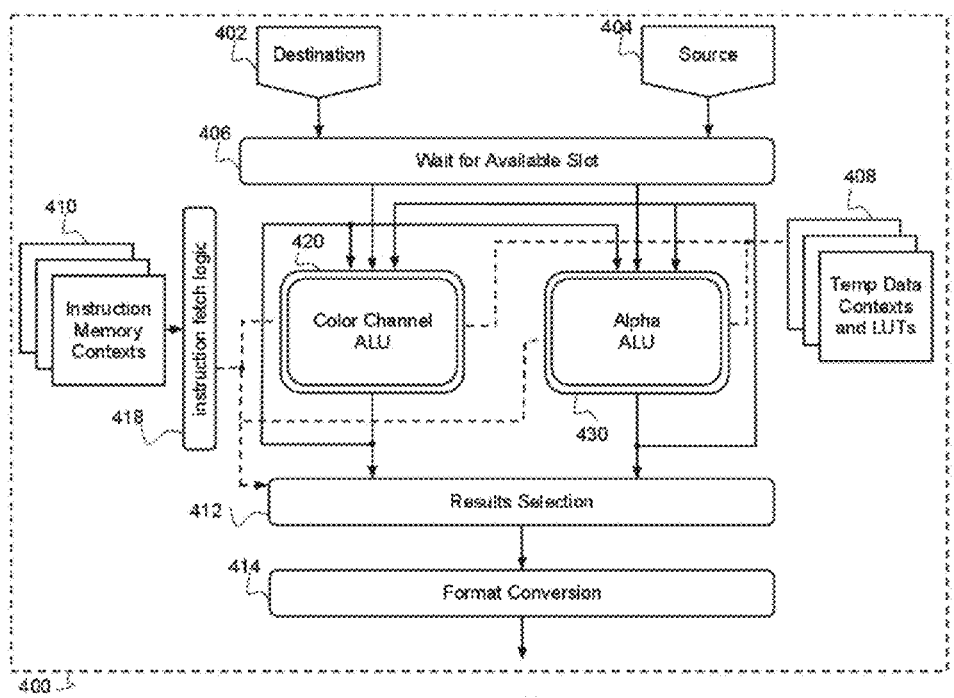
Figure 4: Blending Core structure

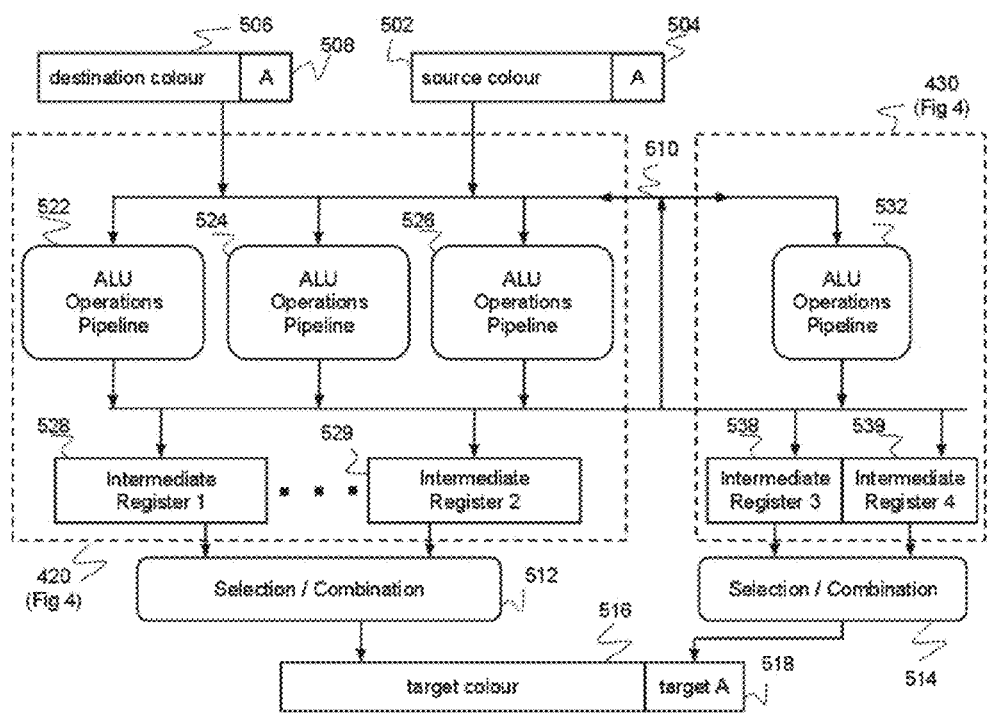
Figure 5: The ALUs of the Blender Core

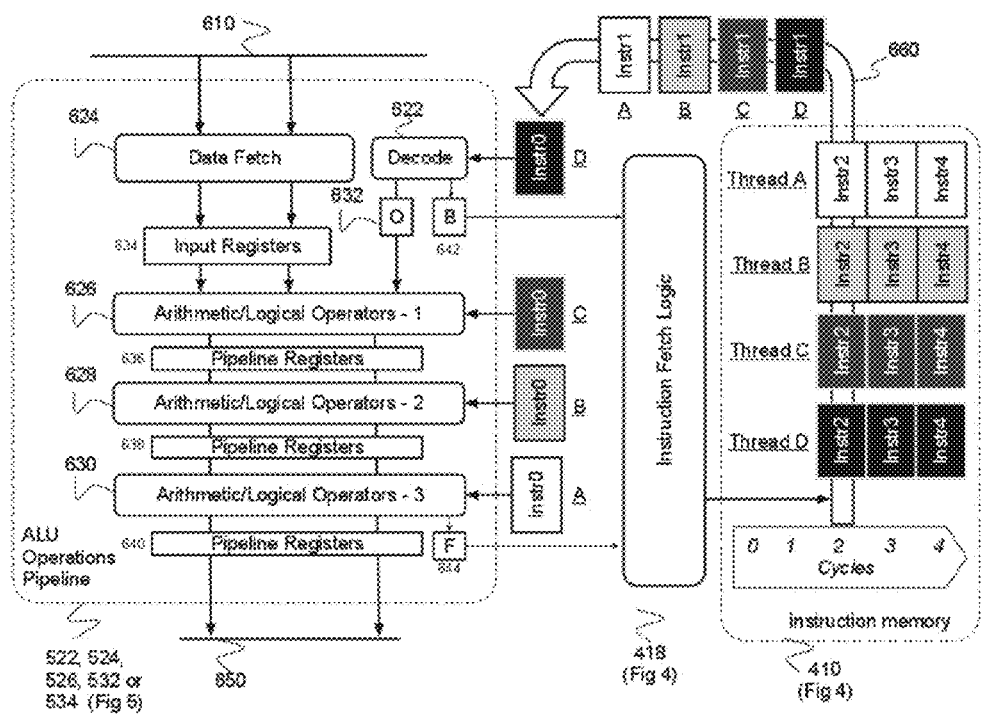
Figure 6: Possible Embodiment of a Multi-threaded ALU

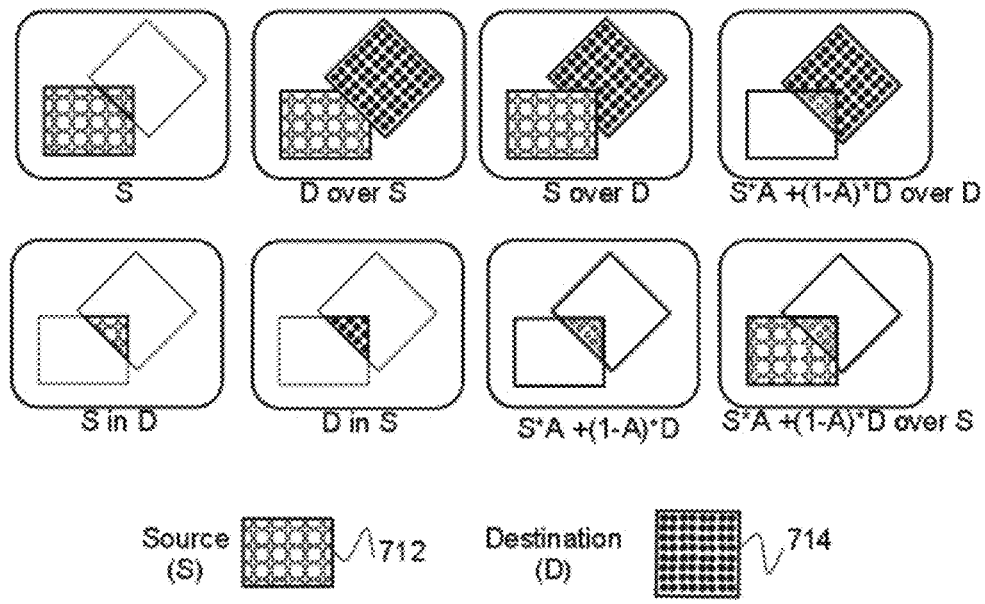
Figure 7: Illustration of basic blending modes
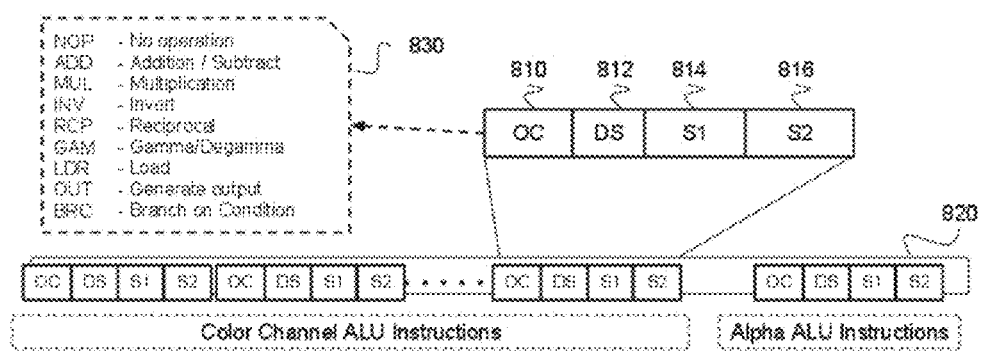
Figure 8: Instruction structure in a possible embodiment of the invention

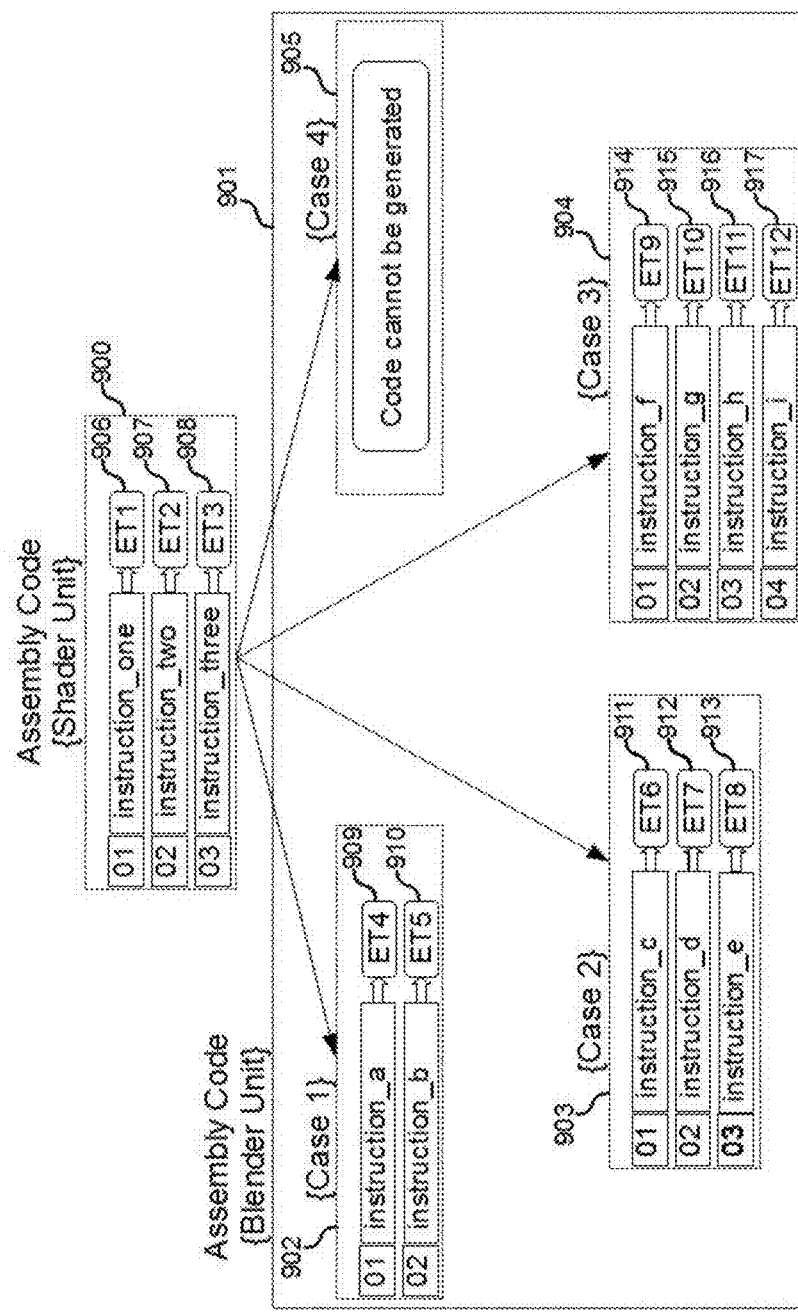
Figure 9: Exemplary cases of Code Analysis performed by Bypass Decision Unit

METHODS OF AND APPARATUS FOR ASSIGNING VERTEX AND FRAGMENT SHADING OPERATIONS TO A MULTI-THREADED MULTI-FORMAT BLENDING DEVICE

CROSS-REFERENCE TO RELATED APPLICATIONS

This application is a Continuation-in-Part of U.S. patent application Ser. No. 13/338,376, filed Dec. 28, 2011, now U.S. Pat. No. 9,058,680, entitled "Multi-Threaded Multi-Format Blending Device for Computer Graphics Operations," the entirety of which is incorporated herein by reference.

BACKGROUND

An exemplary embodiment of the disclosed technology relates generally to graphics processing units (GPUs) and particularly to techniques that may reduce the electrical power consumption of a GPU when the GPU processes graphics or image data.

As it is known in the art, a graphics processing unit is a dedicated hardware module designed to render 2-dimensional (2D) and/or 3-dimensional (3D) computer-generated images for display on a computer screen or on a display device. GPUs are built with a highly pipeline structure and they may require less electrical power consumption than typical, general purpose central processing units (CPUs) for various computational intensive applications such as, but not limited to, video games, image visualization, graphics, graphical user interfaces etc. A GPU may perform various graphics operations to render an image.

As known by those skilled in the art, a preferable way to design a GPU is to rely on a pipeline approach to generate graphics data which can be output, for example, in a display device. A typical graphics pipeline includes a number of stages with the output from one stage possibly being used at another stage and the output of the latter stage possibly being used by another, third, stage and so on so forth. A typical graphics pipeline comprises a geometry preparation stage, a vertex shader stage, a primitive assembly generation stage, a position transformations stage, a primitive setup stage, a rasterization stage, an attribute setup stage, a hidden pixel rejection stage, a fragment shader stage, and a pixel blending stage.

In one embodiment of a graphics pipeline, the two stages of the graphics pipeline, which are programmable, are the vertex and the fragment shader stages. However, different arrangements are also possible, e.g., the rasterization stage may be also programmable or even the depth color related operations may be controlled by a programmable hardware engine. The two stages may be programmed by a general purpose software language (such as C or Fortran) or by an application specific graphics language such as HLSL, Cg, or GLSL.

As is known in the art, the vertex and the fragment stages are typically programmed with small in size, custom shading programs (similar to subroutines) that are invoked for each vertex and for each pixel fragments. Those small, but computationally and memory intensive programs, are usually referred to as shaders or shading programs while other terms can be used. The term shading program will be used hereafter.

An exemplary aspect does not necessarily pertain to a specific arrangement of the programmable stages of the graphics processing pipeline and it is more generally applicable. In particular, the disclosed technology is applicable in specific arrangements of the GPU in which the vertex and the fragment shading programs are executed by the same shader unit or by the same array of shader units (an arrangement known in the art as unified shaders). Furthermore, the disclosed technology is applicable in arrangements of the GPU in which fragment shading programs are executed by a dedicated fragment shader unit (or an array of fragment shader units) and the vertex shading programs are executed by dedicated vertex shader units (or an array of vertex shader units). In addition, the disclosed technology is not restricted to a particular shading or general purpose programming language.

The present technology at least provides a method to bypass the vertex shading unit(s) and/or the fragment shading unit(s) and assign the vertex and/or the fragment shading operations to another unit(s) and more preferably to the pixel blender unit. The bypass decisions may be taken by the GPU compiler or the GPU driver. The bypass decision may be based on a code-level analysis of the to be executed vertex and fragment shading program and a bypass decision may be lead to electrical power reductions even if such approach may lead to a decrease in the ratio that the rendered frames are generated and/or are stored to the frame buffer. Electrical power reductions may be achieved because a programmable pixel blender is typically a less complex circuit with a significantly smaller instruction set than a typical vertex, fragment, and/or a unified shader unit.

In accordance with one or more of embodiments, the pixel blender can be, for example, a multi-threaded, multi-format pixel blender as described in U.S. Publication No. 2013/0169658, entitled "Multi-threaded multi-format blending device for computer graphics operations", the contents of which are incorporated herein by reference in their entirety.

Image blending was used from the start of motion picture generations (See U.S. Pat. No. 1,262,954). Blending was part of computer-based image processing since its origins (See U.S. Pat. Nos. 4,384,338, 4,679,040, and 4,827,344).

Original blender implementations were based on image multiplexing at the output to a screen via analog circuitry or on software programmes running on standard processors. This method is suitable for applications where high-speed software processing resources are available or where there is no high-speed requirement for the generation of the output images, as is the case with photograph editing.

In order to be able to process blending in real time systems, a hardware blender is required. Methods that implement blending in hardware have been proposed as described in the following paragraphs:

One of the first architectures of a blending apparatus was suggested in U.S. Pat. No. 5,592,196. This apparatus includes instructions for implementing the blending functions. These instructions are included in tables which form a blending mode, making the method fast but not as flexible as a full programmable approach.

A hardware implementation of blending targeted explicitly to 3D graphics has been disclosed in U.S. Pat. No. 5,754,185. This method did not include any programmability mechanism but rather defined blending mode via control signals.

Another hardware implementation is described in U.S. Pat. No. 5,896,136. This description mentions a unit that implements blending equations by using an alpha channel of lower resolution than the RGB channels.

In a structure described in U.S. Pat. No. 7,397,479 a method for providing programmable combination of pixel characteristics is disclosed.

Methods for implementing programmable blending were disclosed with U.S. Publication No. US 2006/192788 and U.S. Pat. No. 7,973,797. In both cases, the instructions for blending are provided by a processing unit loading formula or operation descriptors as a sequence to be executed by the blending hardware.

An apparatus for bypassing the fragment shaders in a GPU and assigning the fragment shading workload to a pixel blender is presented in U.S. Pat. No. 8,325,184 B2. The application is applicable only in GPUs following the unified shader approach and it requires significant modifications in the existing register file(s) of the shader cores.

Blending in the above referenced cases is defined as the process of generating a target pixel fragment value (T) by combining various inputs: a said source pixel fragment (S), a said destination pixel fragment (D) and corresponding alpha values ($A_s$, $A_d$) for the source and destination pixels. Depending on the blending mode a different function (f) is applied in order to calculate the target.

For calculating the target ($T=f(S, A_s, D, A_d)$), an arithmetic and logical unit (ALU) is employed that uses the inputs and the blending mode in order to produce the target value. For many blending modes, computing the formula in a single operation requires complex hardware. In order to minimize hardware using simpler operators, the outputs can re-enter the ALU a second time or more until the formula is calculated.

During this iterative process the blender cannot receive new inputs, thus complex blending modes result in lower overall throughput of the GPU. One method to achieve higher throughput is to implement the ALU as a pipeline of at least two threads. If the input pixel fragments can be provided in a continuous flow, the pipeline can produce one output per each clock cycle.

The current state of the art in color blending devices as described above provides fast and programmable functionality. Many different operations—from a predefined set—can be performed on sequences of pixel fragments, where each pixel is represented as a color (c, usually R,G,B) and alpha ($\alpha$) combination.

One shortcoming of current implementations is that they are best fit for systems where the locations of subsequent pixel fragments are more or less continuous. In a modern GPU system, shader unit processing and communication to the main memory for reading and writing pixel fragments is a bottleneck. Thus, the system cannot generate a steady flow of continuous pixel fragments.

Another limitation is that most current implementations operate on integer or fixed-point representations. This makes it harder to interface with floating-point pixel sources and frame buffers. Furthermore, this limits the dynamic range of color representation for each pixel fragment.

Yet another limitation of most current solutions is that the programmability is constrained by a few predefined operators. In one case only (U.S. Pat. No. 7,973,797), the operation is guided by two instructions which can be configured by other entities in the GPU. A more flexible approach is required for full programmability, where any sequence of instructions including flow control can be provided as input in the form of a small program for the blender core.

All existing implementations support the RGBA color scheme that is very common in computer graphics; each pixel fragment is represented by three color channels of Red, Green and Blue (RGB) and an Alpha channel (A). However, if one has to blend non-RGBA pixel fragments (for example pixels in YUVA representation commonly used in video and photography), there needs to be another step of color space conversion, consuming time and bandwidth.

The inventors have found that a multi-threaded, multi-format programmable pixel blender that can be programmed to execute memory operations, i.e., instructions that load or store data or texture data from or to computer memory is a beneficial circuit for perfuming blending operations but also, other, non-blending operations. Such a blending device can save electrical power consumption by executing a number of vertex and/or fragment shading programs, i.e., the GPU shading units are bypassed. A particularly preferred arrangement of a pixel blender device for the operations is disclosed in U.S. application Publication No. 2013/0169658.

All the Patents and Patent Applications referenced above are incorporated herein by reference in their entirety.

SUMMARY

One exemplary aspect is directed toward a method to use the device disclosed in U.S. Publication No. 2013/0169658 in order to lower the electrical power consumption of a GPU under certain circumstances. The disclosed apparatus provides color blending functionality with fully programmable sequences of operations on the source and destination pixel fragments. The architecture of the device is based on the observation that modern graphics systems do not generate steady flow of pixel fragments, leaving the blender with unused processing capability.

An exemplary embodiment of the pixel blender overcomes at least this issue by multiplexing in time many blending functions on different fragments of pixels. This is achieved by the multi-threading capability of the blender core.

An additional unique characteristic of the device, not present in state-of-art pixel blending devices, is that it is able to execute programmable memory operations.

The device disclosed in U.S. Publication No. 2013/0169658 will be referred to as a blender unit hereafter.

This blender unit is built around arithmetic and logic units (ALUs) that implement a plurality of blending functions as defined by a sequence of instructions. The core of the blender unit is capable of pipelining the instructions in order to achieve high throughput of results. Furthermore, the blending unit can handle instructions from a plurality of sequences and operate on a plurality of input streams. This feature of the blending unit is provided by multi-threaded operations, thus minimizing the time a blender unit has to wait for non-continuous pixel fragments to be fetched from a memory.

The disclosed blending device consists of (a) circuitry that reads, reformats and aligns pixel fragments from two inputs, (b) a blending core that can execute threads of instruction sequences in order to generate a result and (c) an output selection and reformatting circuitry that produces the final output pixel fragments.

In one embodiment, the blender unit will at least be able to run the following operations:

Blending of source & destination pixel fragments according to alpha values and a chosen mode.

Concurrent multi-threaded processing of a plurality of pixel fragments with different blending functions applied to each pixel fragment.

Implementation of a wide variety of blending modes including the ones defined in the Khronos group standards OpenGL and OpenVG, regardless if the input or output streams are premultiplied or non-premultiplied.

Conversion from RGB to YUV color space and vice versa.

Gamma/degamma color correction.

Apart from a blender unit, a GPU comprises, inter alia, of one or more cores, termed hereafter as shader units, that execute the image and graphics processing operations. Typically, the shader units are programmable cores with powerful processing capabilities. By way of a non-limited example, a shader unit is a programmable core with an instruction set architecture (ISA) comprising of X machine-level instructions where X typically ranges from 50 up to 100 instructions, or even more.

The blender unit includes a significantly smaller ISA, e.g., Y machine-level instructions where Y may be equal to 9. A detailed description of the machine-level instructions of the pixel blender device is presented in the Detailed Description herein.

The blender unit may not replace a shader unit, because the small number of machine-level instructions of the blender unit is not sufficient to support all graphics software applications (e.g., complex arithmetic operations) that invoke subroutines of a graphics processing application programming interface (API), such as OpenVG or OpenGL. Under certain circumstances, however, an application may not need the full range of the processing capabilities of a shader unit(s).

The inventors have found that there are particular cases that a graphics application can use a less-powerful alternative that can be the blender unit. In such a case(s), the execution of a given fragment and/or vertex shading program will be performed by the blender unit; the shader units will be bypassed. Under this scenario, the execution of a given shading program may be performed with less electrical power consumption, because the blender unit is a smaller and more compact circuit than a GPU shader unit, as it is evident by the number of machine-level instructions supported by the two said devices.

In accordance with one or more embodiments, the determination to bypass the GPU shader units is done by the GPU driver. For the GPU driver to output a beneficial determination, the GPU driver is augmented with a new module, called bypass decision unit (BDU). The BDU of the GPU driver examines all the commands that are included in a given subroutine of a graphics API and outputs if the blender unit is capable to execute those commands. This particular examination is done in two steps.

First, the BDU module scans the commands of an input graphics subroutine in order to determine if the blender unit has the processing capacity to execute the commands. In a positive result (second step), the BDU estimates or calculates the electrical energy needed to execute the commands in the shader unit and in the blender unit. If the electrical power consumption is smaller in the latter case, then the BDU module dispatches configuration information to the GPU to bypass the shader unit(s) and to execute the commands in the blender unit.

In accordance with one or more embodiments of the present disclosure, the shader unit is configured to perform both vertex and fragment shading operations and/or it is dynamically configured to perform only the vertex shading operations and/or it is dynamically configured to perform only the fragment shading operations and/or it is dynamically configured to stay in an idle mode. In the latter case, both the fragment and the vertex shading operations are executed by the blender unit. By virtue of one of the arrangements, components determined to be "as not used" can be bypassed and/or turned off.

In at least one embodiment, a method is described for determining if for the shader unit(s) it is beneficial, in terms of electrical power consumption, to be bypassed.

In accordance with one or more embodiments, a method is described which comprises a GPU driver, the GPU shader unit(s), and a GPU blender unit. The GPU driver outputs a determination about where a graphics subroutine is beneficial to be executed. Based on the determination, the GPU driver dispatches relevant configuration information to the GPU. The configuration information configures the shader and the blender units to execute the fragment shading programs, and/or the vertex shading programs, or both.

This brief summary is provided to introduce a selection of concepts in a simplified form that are further described below in the Detailed Description and also illustrated in the accompanying drawings. This summary is not intended to identify key features or essential features of the claimed subject matter, nor is it intended to be used to limit the scope of the claimed subject matter.

BRIEF DESCRIPTION OF THE DRAWINGS

FIG. 1 shows a typical minimal embedded system-on-chip with a graphics processing unit;

FIG. 2 shows a top level block diagram of a graphical processing unit (GPU) including a multi-threaded, multi-format blender unit for use in accordance with one or more embodiments of the present disclosure;

FIG. 3 shows a possible structure of the blending device for use in accordance with one or more embodiments of the present disclosure;

FIG. 4 contains a block diagram of a possible embodiment of the core of the multi-threaded blender;

FIG. 5 shows the internal structure of the ALU blocks of FIG. 4;

FIG. 6 presents the structure of a possible embodiment of an operations pipeline of the multi-threaded blender unit;

FIG. 7 presents some blending mode examples;

FIG. 8 shows a possible structure for the instructions used by a specific embodiment of the multi-threaded blender; and FIG. 9 illustrates an exemplary method for determining if the execution of a graphics shading program in the blender unit of FIG. 4 may lead to electrical power savings.

DETAILED DESCRIPTION

Graphics Processing Units (GPUs) are increasingly required to perform a plurality of blending functions. When projecting glyphs or user interface items like icons, buttons or window frames over an image, or when combining images from different sources, or when drawing a 3D scene with items on the foreground and items on the background, or when translucent items are displayed, in all those cases a target pixel value on the display is the result of the combination of two input pixel fragments weighted by a value called the alpha of that pixel fragment.

The inventors have found that a multi-threaded, multi-format pixel blender enhanced with the circuitry to perform memory operations (e.g., read operations to texture or image data) is a beneficial device that may be used for other graphics operations beyond blending operations. Under certain circumstances, electrical power consumption can be reduced if specific vertex and fragment shading operations are executed by the blender unit and not by the shader units as typically happens in GPUs that do not operate according to the technology disclosed in this application.

In accordance with one or more of embodiments, the blender unit can be, for example, a multi-threaded, multi-format pixel blender as described in U.S. Publication No. 2013/0169658.

First Usage Scenario: Pixel Blender Performing Image Blending Operations

Some examples of blending modes are described in Table 1, which are defined in the Qt application framework:

TABLE 1

Blending mode examples

| Name | Description |
| --- | --- |
| Source Over / Destination Over | The alpha of the source is used to blend the pixel on top of the destination. Destination Over is the inverse of Source Over. |
| Clear | The pixels in the destination are cleared (set to fully transparent) independent of the source. |
| Source / Destination | The output is the source/destination pixel. |
| Source In / Destination In | The output is the source, where the alpha is reduced by that of the destination. Destination In is the inverse of Source In. |
| Source Out / Destination Out | The output is the source, where alpha is reduced by the inverse of destination. Destination Out is the inverse of Source Out. |
| Source Atop / Destination Atop | The source pixel is blended on top of the destination, with the alpha of the source pixel reduced by the alpha of the destination pixel. Destination Atop is the inverse of Source Atop. |
| Xor | The source, whose alpha is reduced with the inverse of the destination alpha, is merged with the destination, whose alpha is reduced by the inverse of the source alpha. |
| Plus | Both the alpha and color of the source and destination pixels are added together. |
| Multiply | The output is the source color multiplied by the destination. |
| Screen | The source and destination colors are inverted and then multiplied. |
| Overlay | Multiplies or screens the colors depending on the destination color. The destination color is mixed with the source color to reflect the lightness or darkness of the destination |
| Darken | The darker of the source and destination colors is selected. |
| Lighten | The lighter of the source and destination colors is selected. |
| Color Dodge | The destination color is brightened to reflect the source color. A black source color leaves the destination color unchanged. |
| Color Burn | The destination color is darkened to reflect the source color. A white source color leaves the destination color unchanged. |
| Hard Light | Multiplies or screens the colors depending on the source color. A light source color will lighten the destination color, whereas a dark source color will darken the destination color. |
| Soft Light | Darkens or lightens the colors depending on the source color. Similar to HardLight. |
| Difference | Subtracts the darker of the colors from the lighter. Painting with white inverts the destination color, whereas painting with black leaves the destination color unchanged. |
| Exclusion | Similar to Difference, but with a lower contrast. Painting with white inverts the destination color, whereas painting with black leaves the destination color unchanged. |
| Source Or / And / Xor Destination | Does a bitwise OR / AND / XOR operation on the source and destination pixels (src OR dst). |
| Not Source And Not Destination | Does a bitwise NOR operation on the source and destination pixels ((NOT src) AND (NOT dst)). Other similar modes are also defined; ((NOT src) OR (NOT dst)), ((NOT src) XOR dst), (NOT src), ((NOT src) AND dst), (src AND (NOT dst)). |

The example diagram of FIG. 1 shows a typical system that performs graphics processing. The system connects all devices through a Bus Fabric 102 and is controlled by a Central Processing Unit (CPU) 201. The CPU Graphics and Imaging functionality is performed in a Graphics Processing Unit (GPU) 200. The program for the CPU and the GPU as well as the images handled by them are stored in a Memory 101. The display of the system is updated through a Display Controller 103.

In one embodiment of the disclosed invention, the GPU and the display controller are connected through a direct link 104 for frame synchronization and bandwidth shaping.

An exemplary diagram of the GPU 200 and the CPU 201 from FIG. 1 is given in FIG. 2. Connections to the GPU 200 and the Memory 208 are shown as direct links for simplicity, although they are typically implemented through a bus fabric. Although not shown in FIG. 2, an image is synthesized from a model comprising geometric shapes and appearance descriptions (including, inter alia, color and surface textures) for each object in the scene and environment descriptions such as lighting or atmospheric properties. The result of the synthesis is an image represented as a 2D rectangular array of pixel elements, where each pixel represents a discrete color sample of the image. To synthesize the final image, each object in the scene is typically rendered using a four steps sequence which may include: geometry processing, rasterization, pixel or fragment processing, and blending. A detailed description of the graphics rendering operations is not necessary to a complete understanding of the present invention. However, a brief description of those operations is given below.

A Primitive Generator 203 block is used to create vectors, polygons, triangles, curves, etc., as described in documents such as U.S. Pat. No. 5,303,321 which is incorporated herein by reference in its entirety. The core of the GPU is a processing unit, the Shader Unit 204, which calculates graphics functions in order to determine pixel fragment color and transparency values (a stage termed as fragment or pixel shading) or to transform a 3D polygonal (usually a triangle) representation of the object surface so as to produce a 2D projection of the object triangles (a stage termed as vertex shading).

An exemplary embodiment of the technology provided herein is not limited to a specific arrangement of the programmable stages of the graphics processing pipeline and it is more generally applicable. In particular, the disclosed technology is applicable in specific arrangements of the GPU in which the vertex and the fragment shading programs are executed by the same shader unit or an array of identical shader units (an arrangement known in the art as unified shaders approach). Furthermore, the disclosed technology is also applicable in arrangements of the GPU in which fragment shading programs are executed by a dedicated fragment shader unit (or an array of fragment shader units) and the vertex shading programs are executed by dedicated vertex shader units (or an array of vertex shader units).

The two stages of the 3D graphics pipeline which are typically programmable are the stages that perform the vertex and the fragment operations. However, different arrangements are also possible, e.g., the rasterization stage may be also programmable or even the depth color related operations may be controlled by a programmable hardware engine. The two stages may be programmed by a general purpose software language (such as C or Fortran) or even by an application specific graphics language such as HLSL, Cg, or GLSL. The disclosed methods and apparatus are not restricted to a particular shading or general purpose programming language.

One or more of said Shaders Units can exist in a GPU, each one dealing in parallel to the others with separate primitives or fragments. The output of the Shader Units can be processed by units 206 that accelerate the generation of texture elements. Pixel fragments from the Shader Unit are provided as input to a Blender unit 300, which implements color/alpha blending. The Blender unit interfaces with the memory 208 for reading background image fragments and in order to store the blended output.

Structure

In accordance with one or more of embodiments of the present applications, the blender unit can be, for example, a multi-threaded, multi-format pixel blender as described in U.S. Publication No. 2013/0169658.

The blending device is hereby described by reference to the block diagram of FIG. 3. This block diagram shows the units that constitute the blending device (300 in FIG. 2). The block diagram also shows connections between the units.

The blending device operates on input streams of pixel fragments. One input is the stream of source fragments 302 which is typically provided by a Shader Unit. If the blending mode requires that the output solely depends on the incoming fragments, then the data simply enters the Source Reformat and clamping circuit 308. If the decision is made 304 that a Destination Fragment is also required, then a request to the memory is issued 318, and the operation waits until the destination fragment is received 320, and reformatted and clamped 306.

The two input streams come from different sources and need alignment 310 in order to be processed while maintaining spatial coherency. Processing is performed by the core 400 of the blending device. The output of the core may have to be reformatted 312 if the target frame buffer uses a different pixel format. The same block 312 also performs color dithering in order to enhance the visual experience. When multiple outputs are generated, other circuitry 314 re-orders and aligns the pixel data so that they can be stored in the memory's frame buffer 316.

The core of the disclosed blending device is a Blender Core 400 which is multi-threaded. By allocating processing resources to more than one thread of execution, the blender core can multiplex in time a number of parallel blending operations, hiding the latency of arithmetic units, hiding the latency of reading fragments and sustaining throughput.

FIG. 4 shows a possible embodiment of the multi-threaded blender core. A brief description of the structure follows. The blender core reads two aligned and appropriately preformatted pixel fragments, the source 404 and the destination 402, consisting of color and alpha information for each input including possible stencil information in the alpha channel. The two inputs are maintained 406 until a processing slot in the arithmetic logic units becomes available. There are two arithmetic logic units ALUs, one for performing operations with the Alpha channel 430 and one for performing SIMD operations with the color channels 420.

The ALUs perform operations by reading a sequence of instructions from the Instruction Memory Contexts 410. Multiple contexts exist in order to support multi-threading. Each instruction sequence forms a small program that is executed by the disclosed blender core utilizing the operators in the ALUs. The ALUs can also employ temporary data storage and look-up tables 408 to perform certain operations.

The results from the blender core ALUs are selected 412 as defined in the instructions by the output circuitry and appropriately converted 414 to a suitable output pixel format, for example floating point (GL_RGBA32F, GL_RGBA16F), fixed point, RGB888, RGB565 etc.

The output from the blender core can be stalled based on a signal 104 from the display controller 103, indicating high risk of data starvation which might lead to loss of visible frames.

The internal structure of the ALUs of the blender core is shown in FIG. 5. As stated, the inputs are pixel fragments formatted for blending. One is the source pixel fragment that consists of source color 502 and source alpha 504. The second is the destination pixel fragment which consists of destination color 506 and destination alpha 508. The output is a pixel fragment represented by its color channels 516 and its alpha 518.

The color ALU 420 in the diagram contains three parallel operation pipeline blocks 522, 524, 526 so that it can support up to three color channels. Other embodiments with less or more color channels are also possible. The output of each operation pipeline block can be fed back 510 to the ALU for a subsequent processing step or can be forwarded to one of a multitude of intermediate registers 528, 529.

The Alpha ALU 430 contains one operation pipeline block 532 similar to the operation pipeline blocks of the color ALU. The result is stored in a couple of intermediate registers 538, 539 or fed back 510 to the inputs of the ALUs for the next step in the blending sequence.

The output of the color ALU is generated by combining or selecting 512 from the two or more intermediate registers 528, 529 and storing the result in the target pixel color 516. The output of the alpha ALU is generated by combining or selecting 514 from the two intermediate registers 538, 539 and storing the result in the target pixel alpha 518.

The detail of each ALU operation pipeline block is shown in a possible embodiment in FIG. 6. The instructions are fetched for multiple threads from the instruction memory contexts 410. A dedicated fetch logic circuitry 418 chooses one instruction from each active thread per clock and feeds them 660 to the internal pipeline stages of the ALU operation. FIG. 6 shows an example with four threads A, B, C and D. The first instruction from each thread—instr0—is already in the pipeline, the second instruction from each thread—instr1—is ready to be executed, and the following instructions—inst2, instr3, instr4—wait in the memory contexts.

The first stage is instruction decode 622 which determines the type of instruction and the corresponding operator 632 that must be used. It is possible that the instruction op-code affects directly the next instruction that needs to be fetched, thus executing a non-conditional branch. This branch request 642 is reported to the instruction fetch logic 418.

Data are fetched 624 at the same clock cycle with instruction decode from the input port 610 of the ALU which can be connected to a previous output of the same or another ALU operations pipeline or to a temporary location in memory or to a look-up table. Fetched data are fed to the next pipeline stage via registers 634.

The core operators of each currently processed instruction are in the subsequent pipeline stages 626, 628, 630. Operators include multiplication, addition, subtraction, logical operators, reciprocal and floor/ceiling. The result is stored in pipeline registers 636, 638, 640 and the flags 644 generated by the operation are reported to the instruction fetch logic. The described embodiment uses three pipeline stages for the operators; alternative implementations can include more or less stages to achieve an optimum trade-off between complexity, throughput, latency and number of threads that can be supported.

The output from the last stage of the pipeline 640 is directly placed on the port of the ALU operations pipeline 650. Depending on the op-code, the output can be fed back for a next instruction through the ALU or placed on the output register if processing of the specific data has finished.

A possible embodiment of the disclosed invention will include an instruction code structured as:

[OC: Op-code][DS: Destination][(S1: Source of input A][S2: Source of input B]

and four or more such instructions will constitute a very long instruction word (VLIW) instruction for the entire blending core. This is further illustrated in FIG. 8.

The entire VLIW instruction 820 that goes through the operating units consists of three or more instructions for the color channel pipelines and one instruction for the alpha pipeline. In each VLIW instruction, operations for reading inputs, storing outputs, performing SIMD processing of the RGB channels and branching are combined. Each instruction consists of an op-code 810, a destination descriptor 812 and two source descriptors 814, 816. The op-code 810 can be related to a set of mnemonics 830 for the supported operations.

The disclosed blender device is fully programmable, supporting any possible blending function. Some basic blending operations that are supported are shown in FIG. 7. The source 712 and the destination 714 are two input pixel fragments that can be blended in any of the shown manners.

The disclosed blending device also supports the blending modes defined by OpenVG:

TABLE 2

| OpenVG Blending Modes | |
|---|---|
| Name | color Function |
| Source | $C_{src}$ |
| Source over Destination | $C_{src} + (1-\alpha_{src}) * C_{dst}$ |

TABLE 2-continued

| OpenVG Blending Modes | |
|---|---|
| Name | color Function |
| Destination over Source | $C_{src} * (1-\alpha_{dst}) + C_{dst}$ |
| Source in Destination | $C_{src} * a_{dst}$ |
| Destination in Source | $C_{dst} * a_{src}$ |
| Multiply | $\alpha_{src} * C_{src} * (1 - \alpha_{dst}) + \alpha_{dst} * C_{dst} * (1-\alpha_{src}) + \alpha_{src} * C_{src} * \alpha_{dst} * C_{dst}$ |
| Screen | $\alpha_{src} * C_{src} + \alpha_{dst} * C_{dst} - \alpha_{src} * C_{src} * \alpha_{dst} * C_{dst}$ |
| Darken | $\min(\alpha_{src} * C_{src} + \alpha_{dst} * C_{dst} * (1-\alpha_{src}), \alpha_{dst} * C_{dst} + \alpha_{src} * C_{src} (1- \alpha_{dst}))$ |
| Lighten | $\max(\alpha_{src} * C_{src} + \alpha_{dst} * C_{dst} * (1-\alpha_{src}), \alpha_{dst} * C_{dst} + \alpha_{src} * C_{src} - \alpha_{dst}))$ |

The disclosed blending device also supports the OpenGL blending modes, where the function is $c = c_{src} * F_{src} + c_{dst} * F_{dst}$:

TABLE 3

| Blending modes defined for OpenGL | |
|---|---|
| Name | $F_{src}, F_{dst}$ |
| Zero | (0, 0) |
| One | (1, 1) |
| Source color | $(C_{src}, \alpha_{src})$ |
| One Minus Source color | $(1 - C_{src}, 1 - \alpha_{src})$ |
| Destination color | $(C_{dst}, \alpha_{dst})$ |
| One Minus Destination color | $(1 - C_{dst}, 1 - \alpha_{dst})$ |
| Source Alpha | $(\alpha_{src}, \alpha_{src})$ |
| One Minus Source Alpha | $(1 - \alpha_{src}, 1 - \alpha_{src})$ |
| Destination Alpha | $((\alpha_{dst}, \alpha_{dst})$ |
| One Minus Destination Alpha | $(1 - \alpha_{dst}, 1 - \alpha_{dst})$ |
| Source Alpha Saturate | $\min(\alpha_{src}, 1 - \alpha_{dst})$ |

To illustrate the functionality of the blending device, an example of a specific operation is presented. The example shows the instruction sequence for implementing a "Source Over" blending operation with non-premultiplied inputs, as defined by the formula:

$$csrc*\alpha src+(1-\alpha src)*cdst*\alpha dst/\alpha src+(1-\alpha src)*\alpha dst$$

The corresponding VLIW instructions are shown in the following listing.

```
1:   MUL P0,Cs,As      |   NOP            |   LDR Pa,As    |   MUL Pb,Ad, (1-As)
2:   MUL P1,Cd, (1-As) |   ADD Pc,Pa,Pb   |   NOP          |   NOP
3:   MUL P2,P1,Ad      |   ADD P3,P0,P2   |   NOP          |   RCP Pd,Pc
4:   MUL P1,P3,Pd      |   NOP            |   OUT P1,Pa    |   NOP
```

The first VLIW instruction multiplies source color with source alpha csrc*αsrc storing the result in an intermediate register P0, multiplies destination alpha with the inverse of source alpha (1−αsrc)*αdst and prepares the denominator αsrc+(1−αsrc)*αdst in a register Pc. The second instruction finds the reciprocal of Pc into a register Pd, and multiplies destination color cdst with (1−αsrc) storing this in register P1. The third instruction multiplies P1 with the destination alpha and adds P0 and P2, the two parts of the nominator. The fourth VLIW line finalizes calculation by multiplying the nominator P3 with the reciprocal of the denominator Pd. It also sends a command to the output selection blocks 512, 514 to provide the results (P1 and Pa) to the output of the blender on the following clock cycle.

Second Usage Scenario: Pixel Blender Performing Vertex and Fragment Operations.

The inventors have found that the blender unit of FIG. 4 is a particularly useful circuit for performing blending operations, but also other, non-blending, operations. The blending device can save GPU electrical power consumption by executing a number of vertex and/or fragment shading programs i.e., the GPU shading core(s) 204 are bypassed. The specific circumstances under which the GPU shading core(s) bypassing may result in electrical power savings are disclosed hereafter. Methods to determine whether GPU shading core(s) bypassing may result in electrical power savings is also disclosed.

As shown in FIG. 2 when the host processor 201 is executing a graphics software application 209, the software application may invoke software functions provided by a GPU API 210. By way of a non-limiting example, the graphics software application may invoke a function of the OpenVG or OpenGL API. However, the present application is more generally applicable and can be used for other graphics APIs that exist or invented in the future.

Furthermore, when a function of a graphics API 210 is invoked, the graphics API invokes the GPU driver 211. The GPU driver is executed in the host processor. At this stage, the invoked graphics API 210 function is translated or is linked to one or more GPU commands. The latter functionality is performed by software which is part of the GPU driver and it is executed in the host processor. The GPU commands contain information that will be processed by the GPU. When the processing is done, the GPU can generate displayable graphics information. The command(s) issued by the GPU driver contain information that can be recognized and processed by the GPU shader core(s) 204. For example, this information may include numerical and control values that will be stored in the GPU registers, a set of machine or assembly level instructions to be executed by the GPU, and other types of information that the GPU might need to execute the command(s). The machine or assembly level instructions might be an executable code or a non-executable code. For example, it might be in the format of the SPIR-V, or SPIR 1.2, or SPIR 2.0 standards of the Khronos group.

The above description is not restricted to a specific GPU and/or GPU driver implementation and it is considered as a generic description that encompass all alternative GPUs and/or GPU driver implementations. Different implementations and arrangements are also possible. For example, the GPU can be a fixed-pipeline, non-programmable circuit, and/or the GPU driver might send the information to GPU scratchpad memories, or the GPU driver might send pointers referencing specific storage locations in the main memory where the graphics information is stored, or the GPU driver might send the information to any kind of local or global on-chip or off-chip memory usually present in computing systems.

Those skilled in the art will appreciate the applicability of the present technology to other GPUs or GPU driver arrangements in which the GPU arrangement contains the multi-threaded, multi-format blender unit and the said blender unit is able to perform memory operations. The various methods and apparatus disclosed herein provide a novel approach to the usage of the said blender unit for executing, other, non-blending, graphics operations.

In accordance with one or more embodiments, command decoder 202 of GPU decodes the command(s) issued by the GPU driver and configures the shader cores to execute the command. In one embodiment, the decoder 202, inter alia, retrieves the information sent by GPU driver, decodes this information into a set of instructions, and loads the said set of instructions into the shader core(s) for execution. When the latter execution of the said instructions is finished, the shader core(s) stores the results in registers or in memory (this might be the case in which the results are "intermediate" results) for further processing or the shader core(s) sends the results directly to the display controller for display (this might be the case in which the results are in a displayable format).

Depending on the format of the intermediate results, the intermediate results can be further processed by shader unit(s) (if more shading operations have been scheduled by the GPU driver), or by the said multi-threaded, multi-format blender unit (if the intermediate results are processed fragment values), or by other GPU modules e.g., by the GPU rasterizer (e.g., if the intermediate results include geometry-related information). A preferred arrangement of displayable results may be a set of multiple numerical color values of a pixel or a set of pixels. The color numerical values may follow any known color format e.g., RBG, RGBA, or YUV color formats.

The technology described in the present application at least provides a method to bypass the vertex shading unit(s) and/or the fragment shading unit(s) or the unified shader unit(s) and assign the vertex and/or the fragment shading programs to another unit and most preferably to the said blender unit.

In a particularly preferred embodiment, the bypass decision may be taken by the GPU driver 211. In another embodiment of the present application, the bypass decision may by taken by the GPU compiler and/or interpreter. The bypass decision, as disclosed in the present application, will be formulated by a code-level analysis method applied to the ready to be executed vertex and fragment shading programs and a bypass decision may be lead to electrical power reductions even if such approach may lead to a decrease in the ratio that the rendered frames are generated and/or are stored to the frame buffer. The electrical power reductions may be achieved because the said blender unit is typically a less complex circuit with a smaller instruction set than a vertex, and/or a fragment, and/or a unified shader unit.

The inventors have found that a plurality of vertex and fragment shading programs contain memory operations and numerical calculations that are relatively simple. The term simple in the specific context is used as a generic term to identify a number of fragment and vertex shading programs that have one or more common characteristics e.g., they require minimal vertex and/or fragment shading processing. By way of a non-limited example, a simple shading program may be a fragment or a vertex shading program that can be executed by a processing element other than the GPU shader core(s), e.g., the blender unit.

In a particularly preferred example, a simple shading program may be a vertex or a fragment shader that contains machine-level operations that contain only scalar and/or vectorized multiply (MUL) instructions, texture sampling (TEX) instructions, and memory store operations (OUT). Those skilled in the art of graphics software will recognize that a relatively large percentage of vertex and fragment shading programs can be executed by a programmable processor that can execute, inter alia, the three instructions. For example, matrix based viewport transformations (typically part of a plurality of typical vertex shading programs) or background pixel rendering (typically part of a plurality of typical fragment shading programs) can be executed by a programmable core that supports, inter alia, the three instructions. Such a device might be, and preferably is, the multi-threaded, multi-format programmable blender unit as disclosed in U.S. Publication No. 2013/0169658.

In accordance with one or more aspects of the present disclosure, the GPU is configured to operate in a variety of operational modes. In the first operational mode, the GPU shader unit(s) is used to process vertex data of vertex shading programs and to process pixel data of fragment shading programs. In a second operational mode, the GPU shader unit(s) is used to process vertex data of vertex shading programs and the pixel data of the fragment shading programs are processed by another, than the shader unit(s), device e.g., by the blender unit. In a third operational mode, the GPU shader unit(s) is used to process pixel data of fragment shading programs and the vertex data of vertex shading programs are processed by other, than the GPU shader unit(s), device e.g., by the said blender unit. In a fourth operational mode, the said blender unit is used to process both vertex data of vertex shading programs and pixel data of fragment shading programs.

In accordance with or more embodiments, the determination to bypass the GPU shader unit(s) is done by the GPU driver 211. For the GPU driver to output a decision that might reduce the GPU electrical power consumption, the GPU driver is augmented with a new module, called bypass decision unit (BDU) 212. The BDU module of the GPU driver examines all the commands of a given subroutine of a graphics API and outputs if the blender unit is capable to execute those commands.

In a particularly preferred embodiment, the determination to bypass the GPU shader unit(s) is done in two steps. In the first step, the BDU might examine one-by-one the numerical and memory operations of a given shading program in order to verify if the blender unit has the functional units required to execute the given shading program. The complete list of the machine-level operations (both numerical and memory) that can be executed by the blender unit is illustrated in FIG. 8. For example, if a shading program contains only vectorized multiply operations (MUL) and texture sampling operations (TEX), the shading program can be executed by the said blender unit. On the contrary, if, for example, a given shading program contains more complex operations, e.g., operations to calculate the logarithmic or the exponential value of a value stored e.g., in a register, then the said shading program cannot be executed by the said blender unit.

In one embodiment, the BDU 212 might examine one-by-one the operations of a given shading program by scanning the shading program source code. The source code may be the source code of a general purpose software language (such as C or Fortran) or the source code of a graphics specific language such as HLSL, Cg, or GLSL. In another embodiment, the BDU might examine the operations required by a given GPU shading program by scanning the assembly-level or the machine-level representation of the GPU shading program. In a particularly preferred embodiment, the BDU might examine an intermediate representation of the GPU shading program such as a SPIR-V or SPIR-1.2 or SPIR-2.0 representation of the said GPU shading program. The present application is not restricted to any of the above embodiments and is intended to encompass all the above three embodiments or any kind of source-to-source representation of the input shading program.

In the general case, the GPU cores are programmable cores with powerful processing capabilities. Typically, a GPU shader unit is a programmable processing engine with an instruction set architecture (ISA) comprising, for example, X machine-level instructions where X typically ranges from 50 up to 100 instructions, or even more. The ISA of a typical shader unit is decided for the efficient execution of a rich set of graphics operations and those graphics operations typically adhere to a graphics API, for example, the OpenVG or OpenGL API of the Khronos group.

The inventors have found that a plurality of vertex and fragment shading programs can be implemented using a small part of the GPU shader unit ISA, for example Y, where Y is smaller than X. Graphics applications that might use graphics operations that can be executed with a subset of machine-level instructions of the GPU shader unit are, for example, simple graphical user interfaces (GUI) applications or applications used for screen savings purposes.

The blender unit can be designed based on a significantly smaller ISA compared to a 3D GPU, i.e., the said blender unit may have Y machine-level instructions, where Y may be equal to 9 (as depicted in FIG. 8). Any shading program that contains numerical and memory operations that can be executed using the instructions illustrated in FIG. 8, is a shading program (either a vertex or a fragment) that might be executed by the blender unit.

A processing core (e.g., the blender unit) with an ISA of Y instructions is a less complex electronic circuit compared to another processing core (e.g., a shader unit) with an ISA of X instructions, if Y is smaller than X and if Y is a subset of X. A less complex electronic circuit consumes less electrical power when executing an operation, say operation A, compared to a more complex circuit executing the same operation A.

Therefore, under specific circumstances, electrical power consumption can be reduced if a given shading program is executed in the blender unit and not in the GPU shader unit(s). As noted, as a first step, the BDU examines if the said blender unit has the necessary functional units required to execute a given vertex or fragment shading program. Based on this decision, the BDU module 212 (part of the GPU driver) configures appropriately the GPU decoder 202. The operation of the disclosed GPU decoder is described herein.

The second step performed by the BDU is to estimate the electrical power consumed when a given GPU shading program 900 is executed by the GPU shader unit or by the blender unit. In the context of the specific example illustrated in FIG. 9, each machine-level instruction is assigned with a particular energy token, e.g., 906, that is the amount of energy spent by the target processing unit (i.e., shader or blender unit) during the execution of a particular machine-level instruction.

The energy tokens may be measured by a real measurement system, e.g., a wattmeter, or may be estimated by a suitable power simulator (that is, any kind of software program that can estimate the energy consumed by a given instruction of a given processor). Furthermore, the energy tokens may be expressed using any suitable energy unit, for example nanojoules, or as a relative number, for example as a number normalized to the energy consumed by another machine-level operation. The disclosed technology can be independent of the way by which the per-instruction energy tokens have been calculated and/or expressed and the present application intends to include all the equivalent or alternative ways for measuring and expressing the energy consumed by a machine-level instruction of a given vertex or fragment shading program.

The code 900 illustrated in FIG. 9 corresponds to the interpretation of an example shading program in machine-level instructions where the machine-level instructions are part of a GPU shader unit ISA. The codes 902, 903, 904 correspond to all possible cases when the GPU shading program is interpreted in a new set of machine-level instructions where the machine-level instructions are part of the blender unit ISA. In all cases, the machine-level instructions are associated by a measured or calculated energy token.

In accordance with one embodiment of the technology disclosed in this application, the BDU is responsible to generate the machine-level interpretation 900 and 901, analyze the cumulative energy tokens, decide if a given GPU shading program must be executed in the shader unit(s) or in the said blender unit, and configure the GPU decoder with appropriate configuration information.

In particular, for every ready to be executed vertex or fragment shading program, the BDU generates the machine-level or assembly-level representation of the given shading program for both the GPU shader unit ISA and the blender unit ISA. In addition, for each machine-level instruction of the shader and the blender units, an energy token is estimated or calculated. Those skilled in the art will recognize that by virtue of this approach, three possible cases may occur.

According to the embodiment shown in Case 1 902, the generated blender unit machine code includes a smaller number of machine-level instructions compared to the equivalent code generated for shader unit. The term equivalent is used to acknowledge that the shader unit code and the corresponding blender unit code result in exactly the same output e.g., exactly the same numerical values are written to output or intermediate registers or exactly the same numerical values are written to a predefined memory location or to the frame buffer. The applicants want to clarify that the term equivalent must not be interpreted as "identical" or "exactly the same" operations happen in both cases. Those skilled in the art will understand that the embodiment of case 1 902 might occur, for example, when the blender unit is designed based on a VLIW instruction set, while the shader unit designed based on a scalar instruction set.

According to the embodiment shown in Case 2 903, the generated blender unit code consists of the same number of machine-level instructions compared to the equivalent machine-level code generated for the GPU shader unit. Case 2 903 might occur when the machine-level instructions generated for the blender unit cannot be packed into the same VLIW instruction and/or when the shader core is not supporting a single-instruction-multiple-data (SIMD) instruction set, or other circumstances, the analysis of which is not necessary for the complete understanding of the present invention.

According to the embodiment shown in Case 3 904, the generated blender unit code consists of a larger number of machine-level instructions compared to the equivalent machine-level code generated for GPU shader unit. Case 3 904 might occur, for example, when the said shading program produces a number of intermediate results that cannot be hosted or accommodated by the small number of registers of the said blender unit.

In all the above three embodiments, the BDU module calculates the total energy required by the GPU shader unit to execute the code 900, for example K energy units, and the total energy required by the blender unit to execute the code 902 or 903 or 904, for example L energy units. Obviously, the codes correspond to a vertex or fragment shading program. The relation between K and L will define where the shading program must be executed. For example, if K is larger than L, electrical power savings can be realized if the shading program is executed by the blender unit and not by the shader unit(s); the shader unit(s) are bypassed. K and L cumulative energy units are defined by the addition of the corresponding per-instruction energy tokens. For example, K can be calculated as ET1 906 plus ET2 907 plus ET3 908. Similarly, L can be calculated as ET4 909 plus ET5 910 for case 1 902, or as ET6 911 plus ET7 912 plus ET8 913 for case 2 903, or as ET9 914 plus ET10 915 plus ET11 916 plus ET12 917 for case 3 904.

The disclosed technique may lead to electrical power reductions, but, by the application of the present technology, the ratio that the rendered frames are generated and/or are stored to the frame buffer may decrease. In one exemplary embodiment, the applicant proposes to use the disclosed technology in ultra-low power and battery operated devices such as smartphones or smartwatches.

Although not necessary for the complete understanding of the present application, FIG. 9 shows also case 4 905. Case 4 corresponds to a particular embodiment in which the machine-level interpretation of an input vertex or fragment shading program cannot be generated for execution in the blender unit. Obviously, the first stage of the BDU module, as described herein, will capture the occurrence of this particular case 4 905 and the second stage of the BDU module will be skipped.

Case 4 905 might occur due to various reasons. For example, when a given shading program contains complex operations, e.g., operations to calculate the logarithmic or the exponential value of a value stored, e.g., in a register file. Another example might be when a given shading program contains complex branching conditions that cannot be implemented with the branch instruction (illustrated in FIG. 8) of the said blender unit. In a yet another example, the given shading program might contain conditional terminal instructions in positions in which is not possible to assess if the execution of the said shading program in the said blender unit will result in less electrical power consumption compared to the execution of the said program in the GPU shader unit(s).

In a further aspect of the present application, the BDU module, part of the GPU driver, outputs a determination about where a graphics shading program is beneficial to be executed. The GPU driver 211 sends the relevant configuration information to the GPU decoder 202. The GPU decoder is now responsible to configure the shader and the blender unit to perform either the fragment shading operations, or the vertex shading operations, or both. By virtue of one of the said arrangements, components determined to be "as not used" can be bypassed and/or turned off.

The GPU decoder is an electronic module that takes information from the GPU driver and translates the information into control and state information (usually stored in shader unit registers) and executable code that can be recognized and processed by the shader unit(s). According to the technology disclosed in the present application, the GPU decoder 202 of FIG. 2 is modified so as to generate control and state information and executable code that can be recognized and processed either by the shader unit(s) or by the said pixel blender.

The operation of the GPU decoder is defined by the configuration information sent by GPU driver (second stage of BDU). In accordance with one embodiment, the GPU decoder 202 is appropriately modified so as to generate control and state information either for the GPU shader unit(s) or the blender unit. The said GPU decoder can be a combination of the regular GPU decoder and the regular blender unit decoder controlled by an extra configuration signal to enable the former or the latter decoding functionality. The extra configuration signal may be driven by the GPU driver. The GPU decoder 202 can be also a new circuit designed especially for the purposes of the present application. The applicants believe that a detailed illustration of the said decoder is not necessary for a complete understanding of the disclosed technology.

The inventors have found that a preferable device to maximize the electrical power savings that can be achieved by the technology presented in this application is the blender unit disclosed in U.S. Publication No. 2013/0169658. The device performs pixel blending operations, but it is suitable to perform other, non-blending, operations in accordance to the technology provided herein. The device is able to perform memory read and write operations (not only register reads and writes as in U.S. Pat. No. 7,973,797 or in U.S. Pat. No. 8,325,184 B2). Also, the device is designed to operate in multiple source and destination pixels and generate color values for multiple output pixels at the same processor cycle. Also, the device is multi-threaded, thus is able to multiplex in time multiple operations applied to different fragments of pixels minimizing the time the blender unit has to wait for non-continuous pixel fragments to be fetched from a memory or for long latency arithmetic calculations. Finally, the blender device is equipped with a local, private register file 207 that is decoupled from the GPU shader core(s) register file 205.

The four characteristics of the blender unit, not present for example in the devices disclosed in U.S. Pat. No. 7,973,797 or in U.S. Pat. No. 8,325,184 B2, for example enable GPU power conservation in accordance to the methods disclosed in the present applications.

While the invention has been described in conjunction with several specific embodiments, many further alternatives, modifications, and variations will be apparent to those skilled in the art in light of the disclosed description. Thus, the invention described in the present document is intended to embrace all such alternatives, modifications, and variations as may fall within the scope of the included claims.

What is claimed is:

1. A device for parallel multithreaded blending in graphics systems comprising:
    means to receive a plurality of color components and alpha information from multiple source and multiple destination image fragment streams;
    means to receive configuration information prior to executing a batch of graphics operations;
    a blender processing unit capable of combing in parallel the color and alpha channels from a plurality of pixels in the source and destination images in order to produce a plurality of fragment pixels of a target image;
    the blender processing unit capable of executing at least two parallel threads of operation, wherein said blender processing unit multiplexes in time a plurality of blending functions and memory operations on different fragments;
    the blender processing unit supporting concurrent multithreaded processing of the plurality of fragments with different blending functions applied to each fragment;
    the blender processing unit capable of executing programmable concurrent multithreaded vertex shading on vertex primitives using the said configuration information;
    the blender processing unit capable of executing programmable concurrent multithreaded fragment shading on fragment primitives using the said configuration information;
    the blender processing unit processes each of the multiple concurrent threads in a round robin fashion; and
    the blender processing unit comprising multiple register files, multiple execution units, and multiple instruction pointers wherein each parallel thread is associated with a specific and predetermined instruction memory and instruction pointer; and the blender processing unit comprising multiple instruction memories, wherein each instruction memory is associated with one thread and each instruction memory contains instruction code formatted as a very long instruction word and includes multiple op-codes, multiple destination descriptors, and multiple source descriptors.

2. The device of claim 1, where vertex and fragment primitives are processed in floating point format.

3. The device of claim 1, where vertex and fragment primitives are processed in logarithmic format.

4. The device of claim 1, where vertex and fragment primitives are processed in fixed point format.

5. The device of claim 1, where vertex and fragment primitives can be processed in a chosen format at run time, where the choice is between at least two of fixed point, floating point, integer and logarithmic.

6. The device of claim 1, where the configuration information is sent to the said device by a software program running on a general purpose processor.

7. The device of claim 1, where the configuration information is sent to the said device by the GPU decoding circuitry.

8. A GPU unit equipped with a blending device, the said GPU interfacing to a display controller through a signal which notifies the said GPU for bandwidth availability, so that the said GPU can adapt its throughput, wherein the blending device is adapted to combine in parallel color and alpha channels from a plurality pixels in multiple source and multiple destination images in order to produce multiple fragments of a target image, the blending device also adapted to execute at least two parallel threads of operation, wherein the blending device multiplexes in time a plurality of blending functions and memory operations on different fragments, the blending device supporting concurrent multithreaded processing of the plurality of fragments with different blending functions applied to each fragment, the blending device capable of executing programmable concurrent multithreaded vertex shading operations on vertex primitives, the blending device capable of executing programmable concurrent multithreaded fragment shading operations on fragment primitives;
    the blending device processing each of the multiple concurrent threads in a round robin fashion;
    the blending device comprising multiple register files, multiple execution units, and multiple instruction pointers wherein each parallel thread is associated with a specific and predetermined instruction memory and instruction pointer; and
    the blending device comprising multiple instruction memories, wherein each instruction memory is associated with one thread and each instruction memory contains instruction code formatted as a very long instruction word and includes multiple op-codes, multiple destination descriptors, and multiple source descriptors.

9. The device of claim 8, wherein the blending device comprising of means to receive configuration information sent by the GPU decoding circuitry.

10. The device of claim 8, further comprising by means to make a determination based on the said configuration information of performing fragment shading on the said blending device, or of performing vertex shading on the said blending device, or of performing vertex and fragment shading on the said blending device.

11. The device of claim 8, further comprising by means to make a determination based on the said configuration information for the shader units to bypass vertex shading, or bypass fragment shading, or bypass vertex and fragment shading.

12. The device of claim 8, further comprising by means to make a determination based on the said configuration information for turning electrical power off in unified shader units, or for turning electrical power off in vertex shading units, or for turning electrical power off in fragment shader units.

13. A method for parallel multithreaded blending in graphics systems comprising:
  receiving a plurality of color components and alpha information from multiple source and multiple destination image fragment streams;
  receiving configuration information prior to executing a batch of graphics operations;
  combing, in parallel, the color and alpha channels from a plurality of pixels in the source and destination images in order to produce multiple fragments of a target image by executing at least two parallel threads of operation, wherein a blender processing unit multiplexes in time a plurality of blending functions and memory operations on different fragments, the blender processing unit supporting concurrent multithreaded processing of the plurality of fragments with different blending functions applied to each fragment, the blender processing unit supporting concurrent multithreaded vertex shading processing on vertex primitives using the said configuration information, the blender processing unit supporting concurrent multithreaded fragment shading processing on fragment primitives using the said configuration information;
  the blender processing unit processing each of the multiple concurrent threads in a round robin fashion;
  the blender processing unit comprising multiple register files, multiple execution units, and multiple instruction pointers wherein each parallel thread is associated with a specific and predetermined instruction memory and instruction pointer; and
  the blender processing unit comprising multiple instruction memories, wherein each instruction memory is associated with one thread and each instruction memory contains instruction code formatted as a very long instruction word and includes multiple op-codes, multiple destination descriptors, and multiple source descriptors.

14. The method of claim 13, where vertex and fragment primitives are processed in floating point format.

15. The method of claim 13, where vertex and fragment primitives are processed in logarithmic format.

16. The method of claim 13, where vertex and fragment primitives are processed in fixed point format.

17. The method of claim 13, where vertex and fragment primitives can be processed in a chosen format at run time, where the choice is between at least two of fixed point, floating point, integer and logarithmic.

18. The method of claim 13, where the said configuration information is generated by a software program running on a general purpose processor.

19. The method of claim 18, where the said configuration information is generated by profiling vertex shading operations and fragment shading operations using energy consumption criteria.

20. The method of claim 13, where the said configuration information is communicated to the GPU decoding circuitry after the said configuration information is generated.

21. The method of claim 13, where the said configuration information is used to make a determination of whether fragment shading is performed by the said blending processing unit.

22. The method of claim 13, where the said configuration information is used to make a determination of whether vertex shading is performed by the said blending processing unit.

23. The method of claim 13, where the said configuration information is used to make a determination of whether to turning electrical power off in the shader units.

24. A device for blending in graphics systems comprising:
  source and destination image fragment streams that supply a plurality of color components and alpha information;
  a blender processing unit adapted to combine in parallel the color and alpha channels from fragments in multiple source and multiple destination images in order to produce a fragment pixel of a target image;
  a blender processing unit adapted to include extra circuitry capable to receive configuration information prior to executing a batch of graphics operations;
  the blender processing unit further adapted to execute in parallel multiple color and alpha data belonging to same or to different target pixels;
  the blender processing unit including pipelined arithmetic units;
  the blender processing unit adapted to execute at least two parallel threads of operation, with a blending operation in color and alpha data belonging to the same or to different pixels;
  the blender processing unit adapted to execute programmable concurrent vertex shading operations on vertex primitives using the said configuration information;
  the blender processing unit adapted to execute programmable concurrent fragment shading on fragment primitives using the said configuration information;
  the blender unit containing multiple register files to support multithreading;
  the blender unit including a plurality of pipelined arithmetic units;
  the blender processing unit processing each of the multiple concurrent threads in round robin fashion;
  the blender processing unit comprising multiple register files, multiple execution units, and multiple instruction pointers wherein each parallel thread is associated with a specific and predetermined instruction memory and instruction pointer; and
  the blender processing unit comprising multiple instruction memories, wherein each instruction memory is associated with one thread and each instruction memory contains instruction code formatted as a very long instruction word and includes multiple op-codes, multiple destination descriptors, and multiple source descriptors; and
  a storage device adapted to hold a sequence of operations for the blender processing unit, the storage device storing information about how the multiple color and alpha data belonging to the same or to different target pixels can be processed in parallel, wherein the storage device is divided in multiple contexts in order to support multithreading.

* * * * *

UNITED STATES PATENT AND TRADEMARK OFFICE
CERTIFICATE OF CORRECTION

| | | |
|---|---|---|
| PATENT NO. | : 9,202,308 B2 | Page 1 of 1 |
| APPLICATION NO. | : 14/736553 | |
| DATED | : December 1, 2015 | |
| INVENTOR(S) | : Georgios Keramidas et al. | |

It is certified that error appears in the above-identified patent and that said Letters Patent is hereby corrected as shown below:

On the Title Page, at item (71) "Applicant:", Column 1, line 8, please delete "THINK SILICON LTD" and insert -- THINK SILICON SA --, therefore.

Signed and Sealed this
Twenty-ninth Day of March, 2016

Michelle K. Lee
*Director of the United States Patent and Trademark Office*